United States Patent [19]

Teskey

[11] Patent Number: 4,821,122
[45] Date of Patent: Apr. 11, 1989

[54] TV RECEIVER WITH AUTOMATIC RF/BASEBAND SIGNAL

[75] Inventor: John F. Teskey, Greenfield, Ind.

[73] Assignee: RCA Licensing Corporation, Princeton, N.J.

[21] Appl. No.: 212,169

[22] Filed: Jun. 13, 1988

Related U.S. Application Data

[63] Continuation of Ser. No. 5,795, Jan. 21, 1987, abandoned.

[51] Int. Cl.⁴ .................. H04N 5/268; H04B 1/06
[52] U.S. Cl. .................................. 358/181; 358/193.1; 455/135
[58] Field of Search .................. 358/181, 191.1, 193.1, 358/195.1, 903, 335; 455/135, 184

[56] References Cited

U.S. PATENT DOCUMENTS

| | | | |
|---|---|---|---|
| 3,922,641 | 11/1975 | Gates | 358/181 |
| 4,097,899 | 6/1978 | Yu | 358/181 |
| 4,329,675 | 5/1982 | Van Hulle | 358/181 |
| 4,361,854 | 11/1982 | Wolfe | 358/188 |
| 4,463,382 | 7/1984 | Pellegrini | 358/181 |
| 4,468,701 | 8/1984 | Burcher | 358/181 |
| 4,680,634 | 7/1987 | Nanba | 358/181 |

OTHER PUBLICATIONS

Chinese language document entitled "The Principle of CATV System", by Kuo-rong Lin, published by Chuan-Hwa Science and Technology Book Col., Ltd. 1-1986.

Primary Examiner—Tommy P. Chin
Attorney, Agent, or Firm—Eugene M. Whitacre; Paul J. Rasmussen; Eugene M. Whitacre

[57] ABSTRACT

A receiver includes a video switch operated by a controller for selecting antenna or auxiliary (baseband) video signals for display. When placed in a "VCR" operating mode the controller first selects the auxiliary input for display. If a video signal is not present at the auxiliary input the controller causes the switch to select the output of a tuner thereby providing an automatic signal search to locate the VCR signal which may be applied to either of the antenna and auxiliary inputs. An extension of the search includes tuning the tuner to channel 3 and, if no signal is found, tuning the tuner to channel 4. Upon failure to find an active video signal on either channel the tuner is returned to the last channel received prior to selecting the VCR mode of operation thereby releaving the user of both mode selection and channel selection requirements for locating the VCR signal.

3 Claims, 2 Drawing Sheets

TV RECEIVER WITH AUTOMATIC RF/BASEBAND SIGNAL

This is a continuation of application Ser. No. 005,795, filed Jan. 21, 1987, now abandoned.

FIELD OF THE INVENTION

This invention relates to television receivers of the type having radio frequency (RF) and baseband video inputs and a switch for selecting input signals to be displayed from the such inputs.

BACKGROUND OF THE INVENTION

Television receivers which feature plural inputs for RF modulated and baseband video input signals are well known and are generally referred to as "receiver-monitors". When using such receivers, conventional broadcast or cable signals are applied to the RF input and desired channels are selected by a tuner for display. The baseband video input is provided for sources such as video cassette recorders or computers having baseband video outputs which thereby eliminates the need for video signal remodulation in the source and subsequent demodulation in the receiver and therefore provides a superior picture when using such sources.

To provide compatibility with conventional TV receivers and the newer receiver/monitors, it is common practice to provide both RF and baseband outputs on video cassette recorders. Accordingly, a user has more than one option for connecting a VCR to a television receiver-monitor. The user could, for example, connect the RF output of the VCR to the RF input of the receiver. For this hook-up the user would tune the receiver to one of the two television channels (e.g., 3 or 4) normally provided on the VCR for output channel selection. Alternatively, the user would connect the baseband audio and video outputs of the VCR to the baseband audio and video inputs of the receiver. This connection is normally preferred because, as previously mentioned, it avoids the potential signal distortion problem associated with modulation and demodulation of the audio and video signals. In certain cases a user may wish to connect a VCR which has only an RF output to a monitor-receiver. In this case the user has no choice. He must connect the VCR RF output to the RF (tuner) input of the receiver.

SUMMARY OF THE INVENTION

The present invention resides in part in recognizing that a problem exists with regard to how to operate a receiver-monitor used with sources having only an RF output or having both baseband and RF outputs. As an example, if a user asks a guest to play a video tape, the guest may have no idea of how the user's TV system is connected and so may place the receiver-monitor in the RF mode when the VCR is actually connected to the baseband input of the receiver-monitor. Conversely, the guest may select the baseband (auxiliary input) mode when the RF mode is being used. Consequently, the guest may experience some confusion if his first choice is wrong. In fact, even the host may have forgotten how he configured his own system and both guest and host may have to trace out the system wiring to determine how to select the VCR mode in the overall system or spend some time with the receiver-monitor controls in an effort to manually search for the VCR signal. The present invention is directed to solving this newly discovered problem.

A television receiver embodying the invention includes a tuner means for providing a first video signal when tuned to an occupied television channel, an auxiliary input means for connection to an external source for providing a second video signal when said external source is activated and a display means. A switch means is provided having a tuner position for coupling the first signal to the display means and an auxiliary position for coupling the second signal to the display means. A detector means detects the presence of an active video component of the coupled signal to provide an indicator signal. A control means, coupled to a keyboard means, has a first operating mode responsive to activation of a first key for placing the switch means in the tuner position. The control means assumes a second operating mode in response to activation of a second key for initially placing the switch means in the auxiliary position and is subsequently responsive to the absence of the active video indicator signal for placing the switch means in the tuner position.

In accordance with a further aspect of the invention the receiver further comprises a tuning voltage generator means responsive to the control means for supplying a tuning voltage to the tuner means, the control means being further responsive in the second operating mode subsequent to having placed the switch means in the tuner position for supplying a control signal to the generator means for causing the tuner to tune to a predetermined channel.

In accordance with another aspect of the invention the control means is further responsive in the second operating mode for retuning the tuner means to a second predetermined channel in response to the absence of the active video indicator signal when tuned to the first predetermined channel.

In accordance with yet another aspect of the invention the receiver further includes a memory means for storing a channel number previously tuned by the tuner means during the first operating mode of the control means and the control means is further responsive in the second operating mode to the absence of the active video indicator signal when the tuner is tuned to the second predetermined channel for causing the generator means to retune the tuner means to the channel number stored in the memory means.

DETAILED DESCRIPTION

Figure 1:
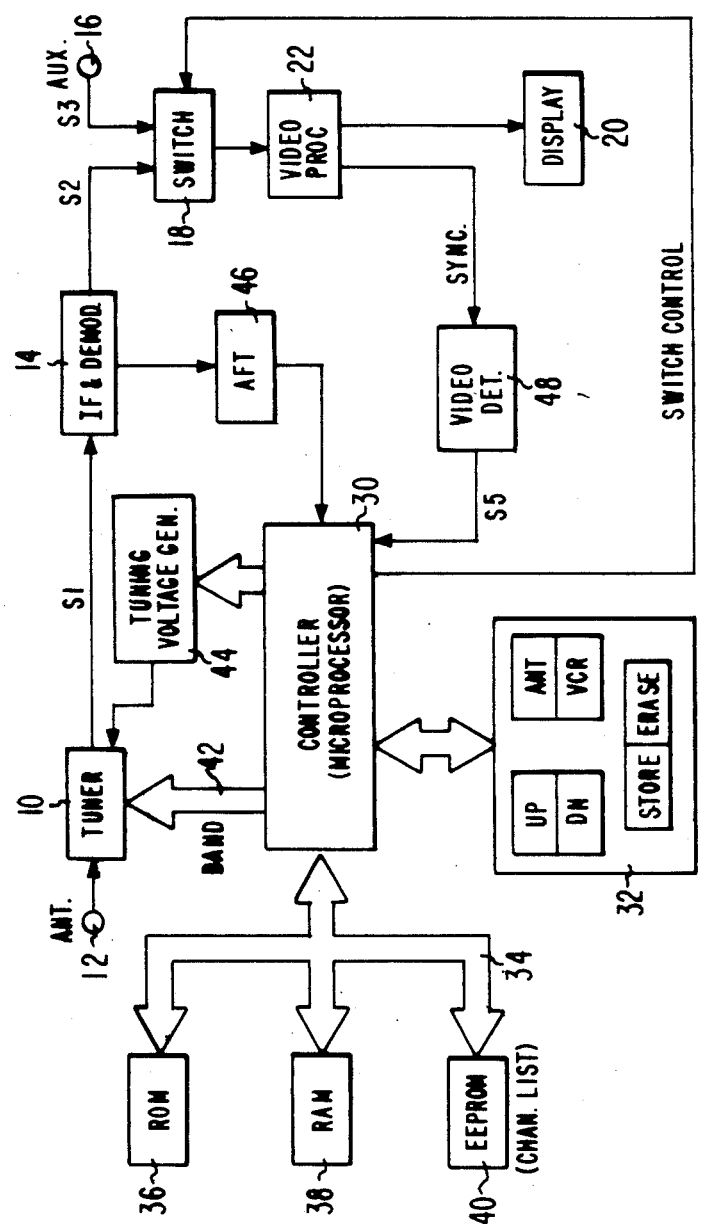
FIG. 1 is a block diagram of a television receiver embodying the invention.

The receiver of FIG. 1 includes a tuner 10 having an antenna input terminal 12 for connection to a television antenna, a cable system or another suitable source of RF modulated video signals such as the RF output of a video cassette recorder (VCR). The tuner output signal S1 is applied to an IF (intermediate frequency) signal processing and demodulation unit 14 of conventional design which provides the functions of IF amplification and video signal demodulation to provide a baseband video output signal S2. An auxiliary input terminal 16 is provided for connection to an external source of baseband video signal S3 which may be provided, for example, by a VCR of the type having a baseband video output, a computer or other suitable source. Video cassette recorders having both RF and baseband video outputs are commercially available.

A video switch 18 is provided for selectively coupling the tuner selected baseband signal S2 and the auxiliary video signal S3 to a display unit 20 via a conventional video processing unit 22 for display of the coupled signal S4. Unit 22 provides various functions such as luma-chroma separation, hue and saturation control, peaking and contrast control, sweep signal generation and so forth for conditioning the coupled signal S4 for display on unit 20 (e.g., a direct view kinescope, a projection device or some other suitable video display apparatus).

Selection of channels by tuner 10 and control of switch 18 is provided by a microprocessor based controller 30 which receives control signals from a keyboard 32 having up/down channel scanning control keys (UP, DN), antenna/VCR mode selection keys (ANT, VCR) and a pair of channel store and erase keys (STORE, ERASE). Controller 30 is coupled via bus 34 to a read only memory (ROM) 36, a random access memory (RAM) 38 and an electrically erasable programmable read only memory (EEPROM) 40. Memory 36 stores the controller operation program, memory 38 provides a "scratch pad memory", and memory 40 stores a channel list selected by the user.

Controller 30 has an output for supplying a band selection signal via bus 42 to tuner 10 for selecting bands to be tuned (e.g., low, mid and high band VHF, UHF, etc.) and has an output coupled to supply control signals to a tuning voltage generator 44 that generates specific channel tuning voltages for tuner 10. Generator 44 may be of the frequency synthesis type described, for example, by J. Tults and M. French in U.S. Pat. No. 4,405,947 which issued Sept. 20, 1983. Another example is given by J. Tults in U.S. Pat. No. 4,485,404 which issued Nov. 27, 1984. An automatic fine tuning (AF) unit 46 is coupled to unit 14 for supplying AFT signals to controller 30 for fine tuning generator 44 to channels selected by the user with the UP/DN channel selection keys on keyboard unit 32. The STORE and ERASE keys on keyboard unit 32 enable the user to enter a list of desired channels in EEPROM 40 to be tuned by tuner 10 in response to the UP/DN channel selection keys.

In a conventional television receiver/monitor, as has been described thus far, activation of the ANT key on keyboard 32 would place switch 18 in the antenna position thereby selecting the tuner signal S2 for display on unit 20 and activation of the VCR key would normally place switch 18 in the AUXILIARY position for displaying signal S3 on unit 20. In accordance with the present invention, the state of switch 18 is made conditional in the VCR mode upon detection of a "valid" video signal component being present in the signal selected by switch 18, namely, signal S4. The term "valid", as used herein, means that the signal S4 is in fact a video signal and is not simply noise as may be the case when tuner 10 is tuned to an unoccupied channel or auxiliary input 16 is not connected to a source or the source it is connected to is inactivated.

In accordance with the present invention, the receiver/monitor of FIG. 1 includes a video signal detector 48 coupled to receive a synchronizing signal component of ("sync") signal S4 provided by video processor 22 and coupled to supply a "valid video" indicator signal to controller 30 when signal S4 is an active video signal. Detector 48 may be implemented by detecting synchronizing components of signal S4 which comply with a given broadcast standard. For NTSC standard video signals the vertical synchronizing signal should be at either 59.94 Hz for color and for monochrome transmissions, respectively, and the horizontal synchronizing component should be at frequencies of 15,734 Hz or 15,750 Hz for color and for monochrome, respectively. If, in NTSC standard receivers, the vertical synchronizing signal is used for valid signal detection, the range should be at least from 59.94 to 60 Hz. Similarly, for NTSC standard receivers, the detection range for horizontal synchronizing signals should cover the range for horizontal synchronizing signals should cover the range from 15,734 Hz to 15,750 Hz at least. Both vertical and horizontal synchronizing signals may be used for valid video signal detection if desired. For PAL or SECAM standard receivers the appropriate vertical and/or horizontal synchronizing signal frequencies may be used for valid video signal identification. An alternative to detection of synchronizing signal timing for identification of "valid" video signals (as distinguished from noise) would be to measure the width or amplitudes (tip-to-poarch) of the signal to verify that the signal is, in fact, a video signal and not just noise.

Figure 2:
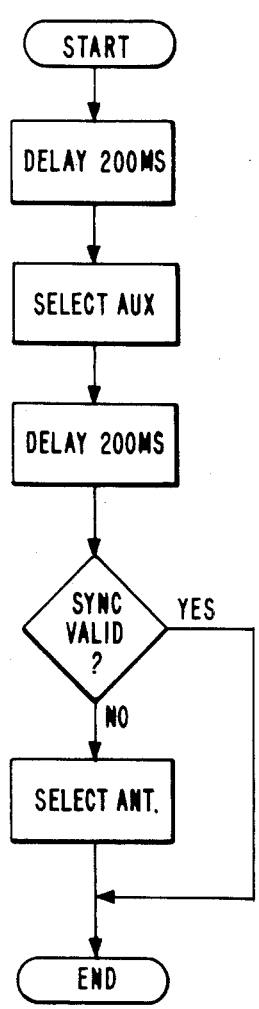
FIGS. 2 and 3 are flow charts illustrating operation of a controller used in the receiver of FIG. 1.

In a presently preferred application of the principles of the invention, controller 30 is programmed as shown in FIG. 2 to respond to activation of the VCR key on keyboard 32 and to the presence or absence of the valid video indicator signal S5 as will now be described. First, as in the conventional receiver, controller 30 places switch 18 in the TUNER mode if the ANTENNA key is activated. If however, the user activates the VCR Key, the program of FIG. 2 is activated.

The first program step is a "no-op" meaning a no operation. The program simply implements a delay of a short period (e.g., 200 milliseconds). This feature of the invention is provided for users who may have a so-called "unified remote control system" in which a single remote control unit controls both the users VCR and television receiver. Depressing the VCR key on such a system automatically turns on the VCR. The delay provided by the first no-op program step allows the VCR time to "power-up" and stabilize.

The second program step comprises sending a signal to switch 18 which places switch 18 in the AUXILIARY input selection mode. At this time, the VCR has had sufficient time to "power-up" and, if it is actually connected to AUX terminal 16, will be applying a video signal thereto.

The third step comprises another 200 millisecond delay in which no operation is performed. The function of this delay is to allow time for video detector 48 to determine if signal S4 really is a valid video signal. Recall that the user may have connected the RF output of his VCR to ANT terminal 12 rather than AUX terminal 16. If so, signal S4 may be "inactive" (i.e., just noise).

The fourth program step provides a test of signal S4 by examining the output of video detector 48. If a valid video signal is found the program ends and switch 18 is maintained in the AUXILIARY position for coupling the baseband video output signal of the VCR (terminal 16) to the display unit 20. However, if signal S5 indicates that the video signal is not valid, controller 30 places switch 18 in the TUNER position and ends.

The reason that controller 30 returns switch 18 to the TUNER position after activation of the VCR key and failure to detect an active video signal coupled by switch 18, is that it is most likely that the user has configured his system with the VCR connected to the tuner if the VCR signal cannot be found at the AUXILIARY input when in the VCR mode. An advantage of this signal search upon activation of the VCR key, is that the user, or his guest, need have no knowledge of how the system is actually configured to operate in the VCR mode. In other words, the system assumes first that the VCR baseband input is used, tests for the presence of a valid video signal there and, if no active signal is found automatically switches to the tuner input. These aspects of the invention substantially increase the likelihood of successfully finding and displaying the VCR signal when operating in the VCR mode.

Figure 3:
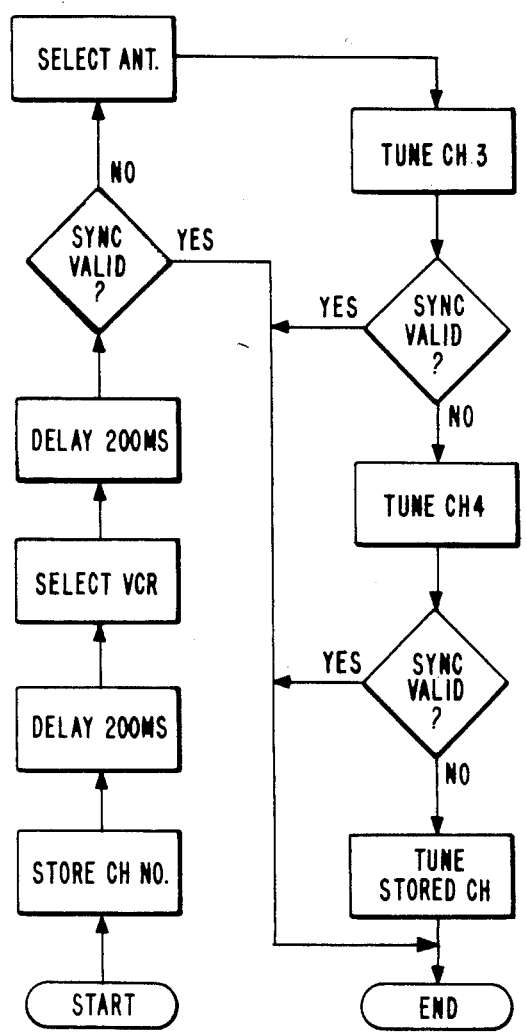

FIG. 3 illustrates an extension of the flowchart of FIG. 2 embodying additional aspects of the invention for further increasing the likelihood of automatically locating and selecting the VCR signal for display upon activation of the VCR key on keyboard 32. In addition to automatically switching back to the tuner input if a valid video signal is not found at the auxiliary input, the controller 30 then provides a channel search for a valid video signal. Specifically, upon returning switch 18 to the tuner position, controller 30 first causes tuner 10 to tune channel 3. If channel 3 is active ("sync valid") the program ends. If not, controller 30 retunes tuner 10 to channel 4. Again, the program ends if channel 4 is active.

Finally, if channel 4 is also not active, controller 30 retunes tuner 10 to the last channel the receiver was tuned to prior to selecting the VCR mode. This last channel information accounted for by the first step in the program of FIG. 3 which instructs controller 30 to store the channel number to which tuner 10 is tuned at the time that the VCR key is activated. Either RAM 38 or EEPROM 40 may be used for his previous channel storage function. In this example of the invention, as previously noted, the receiver automatically checks all possibilities for a VCR hoop-up (i.e., an auxiliary connection, a tuner connection using channel 3 and a tuner connection using channel 4) and also covers the additional possibility that the VCR is either not connected at all or is not turned on. This latter possibility is the reason for defaulting to the last tuned channel upon failure to locate a valid video signal on the auxiliary input and channels 3 and 4.

What is claimed is:

1. A television receiver, comprising:
   tuner means for providing a first video signal when tuned to an occupied television channel;
   auxiliary input means for connection to an external source for providing a second video signal;
   processing means for processing a video signal;
   switch means having a tuner position for coupling said first video signal to said processing means and having an auxiliary position for coupling said second video signal to said processing means;
   detector means coupled to an output of said switch means for detecting the presence of an active video components of said first video signal when said switch means is in said tuner position, for detecting the presence of said active video components of said second video signal when said switch means is in said auxiliary position and for providing an active video indicator signal;
   keyboard means having plural keys;
   control means having a first operating mode responsive to activation of a first one of said keys for placing said switch means in said tuner position;
   said control means having a second operating mode responsive to activation of a second one of said keys for initially placing said switch means in said auxiliary position and subsequently being responsive to the absence of said active video indicator signal for placing said switch means in said tuner position, and further comprising:
   tuning voltage generator means responsive to said control means for supplying tuning voltage to said tuner means, said control means being further responsive in said second mode of operation subsequent to having placed said switch means in said tuner position for supplying a control signal to said generator means for causing said tuner means to tune to a first predetermined channel.

2. A television receiver, comprising:
   tuner means for providing a first video signal when tuned to an occupied television channel;
   auxiliary input means for connection to an external source for providing a second video signal;
   processing means for processing a video signal;
   switch means having a tuner position for coupling said first video signal to said processing means and having an auxiliary position for coupling said second video signal to said processing means;
   detector means coupled to an output of said switch means for detecting the presence of an active video component of said first video signal when said switch means is in said tuner position, for detecting the presence of said active video component of said second video signal when said switch means is in said auxiliary position and for providing an active video indicator signal;
   keyboard means having plural keys;
   control means having a first operating mode responsive to activation of a first one of said keys for placing said switch means in said tuner position;
   said control means having a second operating mode responsive to activation of a second one of said keys for initially placing said switch means in said auxiliary position and subsequently being responsive to the absence of said active video indicator signal for placing said switch means in said tuner position;
   tuning voltage generator means responsive to said control means for supplying a tuning voltage to said tuner means, said control means being further responsive in said second mode of operation subsequent to having placed said switch means in said tuner position for supplying a control signal to said generator means for causing said tuner means to tune to a first predetermined channel, and wherein:
   said control means being further responsive in said second mode of operation for returning said tuner means to a second predetermined channel in response to the absence of said active video indicator signal when tuned to said first predetermined channel.

3. A television receiver as recited in claim 2 further comprising memory means for storing a channel number previously tuned by said tuner means during said first operating mode of said control means, said control means being further responsive in said second operating mode to the absence of said active video indicator signal when said tuner means is tuned to said second predetermined channel for causing said generator means to retune said tuner means to said channel previously stored in the memory means.

* * * * *